United States Patent Office 3,195,629
Patented July 20, 1965

3,195,629
USE OF PARTIALLY OXIDIZED OIL IN A
WATERFLOODING PROCESS
Robert O. Leach, Tulsa, Okla., assignor to Pan American Petroleum Corporation, Tulsa, Okla., a corporation of Delaware
No Drawing. Filed Dec. 31, 1962, Ser. No. 248,210
15 Claims. (Cl. 166—9)

This invention relates to a method for recovery of petroleum from underground formations. More particularly, it relates to an improved method for waterflooding.

It has been previously proposed that an oxidizing agent such as air be injected into an oil-bearing earth formation to partially oxidize the oil, after which a small amount of alkaline water is injected into the formation ahead of regular flooding water. The theory is that the base in the water reacts with the acid in the oil to form a surface-active agent at the oil-water interface where it is most effective to increase displacement of the oil by the water.

Laboratory experience with this process has shown that it improves oil recovery very little, if at all. This is probably because as the alkaline water flows through the formation, residual connate water as well as oil is displaced ahead of the alkaline water. Thus, a bank of connate water develops between the oxidized oil and the alkaline water. The alkaline water does not come into contact with the oil until the oil has become discontinuous due to the displacement action of the connate water. After the oil phase has become discontinuous, there is little benefit in contacting it with alkaline water.

An object of this invention is to provide a process in which a partially oxidized oil is displaced through the formation by an alkaline water without the collection of connate water between the oil and the alkaline water. Other objects will be apparent from the following description and claims.

In general, I accomplish the objects of my invention by a four-step process. In the first step the partial oxidation of the oil is carried out in any convenient way, as by injecting air, peroxides or other oxidizing agents in gaseous or liquid form as has been done in the past. After the partial oxidation step has been completed, a volume of alkaline water is injected, again as has been done in the past. The alkaline water is then followed by a bank of oil preferably introduced in small batches intermittently with air. The oil bank is, in turn, followed by ordinary flooding water.

As the oil bank moves through the formation it re-establishes continuity of the oil phase and decreases the water content of the formation. The water following the oil bank displaces not only the oil but the residual alkaline water. As a result, a bank of alkaline water builds up behind the oil bank. The function of such an oil bank following a specially treated water is described in more detail in U.S. Patent 3,006,411, Holbrook.

In the Holbrook patent the specially treated water contains a surfactant. The result of the process in Holbrook is that the surfactant-treated water eventually displaces the continuous oil phase through the formation. This is the desired condition.

It will be apparent, however, that the Holbrook oil bank process is not entirely applicable to a method in which the oil is partially oxidized and is then followed by alkaline water. In the process involving partial oxidation, the alkaline water contains only half a surfactant. The other half is in the oil that moves ahead of the alkaline water. The oil bank proposed by Holbrook does not contain the other half of the surfactant and serves to displace the oxidized oil ahead of it by miscible fluid displacement, thus separating the oxidized oil and the alkaline water which collects behind the oil bank.

That the process described in 3,006,411, Holbrook, is not entirely applicable to a method in which oil is partially oxidized and is then followed by alkaline water is well confirmed by another U.S. patent 3,036,631, Holbrook. This patent teaches partial oxidation of oil in the formation followed by injection of alkaline water. Although the application on which this patent is based was filed by the same inventor less than a year after he filed the application on which 3,006,411 is based, the application for 3,036,631 does not mention the process of 3,006,411. This is in spite of the method of 3,036,631 being subject to exactly the same problem to which the process of 3,006,411 is directed.

I have now found that the problem, at least in one particular type of formation, is not as serious as it has apparently been thought to be. If a formation is preferentially oil wettable, then the oil bank quickly displaces the water. As a result, a small bank of oil decreases the water content of the formation nearly to the irreducible minimum concentration. The water following the oil bank displaces much of the oil, but the oil concentration will only slowly approach the irreducible minimum. It is true that the oil in the oil bank tends to displace the residual oxidized oil and maintain this oxidized oil in the leading edge of the oil bank. As a result, residual oil, after passage of the oil bank, will be mostly the original oil in the oil bank. If the bank is small, the original oil is rapidly lost as residual oil, bringing the oxidized oil into the trailing edge of the bank where it can come into contact with the alkaline water. Thus, if a formation is preferentially oil wettable and a small oil bank is used, this technique can be effective in causing an alkaline water to displace a continuous, partially oxidized oil phase through at least a portion of the reservoir.

If the formation is preferentially water wettable, a rather large oil bank will be necessary to decrease the residual water to a low value. Such a reduction in residual water content is considered necessary since if a high residual water content is permitted, a very large volume of alkaline water must be used to avoid by-passing of all the alkaline water by the oil bank, as described in more detail in 3,006,411, Holbrook. Even so, it may be of some value to employ an oil bank. There may be little beneficial results near the injection well where the injected oil bank separates the oxidized oil from the following akaline water. By the time the oil bank approaches a producing well, however, the original oil in the oil bank should have been lost, bringing the oxidized oil and the alkaline water into contact. Thus, the injection of an oil bank following the alkaline water and preceding the ordinary flooding water can be of at least some benefit even if the formation is water wet.

In order to adapt the oil bank technique to use with partial oxidation followed by alkaline water, it is best to alternate small volumes of air with portions of the oil bank. The air serves three purposes. First, it partially oxidizes the oil so the alkaline water begins to drive a partially oxidized, continuous oil phase through the reservoir at an earlier point in the flooding operation. Second, the air decreases the amount of residual water remaining after passage of the oil bank, thus reducing the quantity of alkaline water which must be used. This function is explained below in more detail. Third, the air may lessen the amount of residual oil remaining after passage of the flooding water.

The first effect, that of partially oxidizing the oil bank, is self-explanatory. The other effects were demonstrated in the laboratory. The experiments were performed in water-wet torpedo sandstone cores 1⅞ inches in diameter and 10 feet long. Close fitting neoprene rubber tubes were stretched over each core to provide a seal. The tubing extended over end pieces which permitted external connections. The neoprene-encased cores were placed inside of 2-inch I.D. steel pressure tubes. The annular space between the steel and neoprene tubes was pressured to a level in excess of the run pressure, thereby providing a seal.

In one case the core was evacuated and then filled with 0.25 normal sodium chloride brine. An oil saturation of 60 percent was established by flooding the core first with a 10-centipoise oil to reduce water saturation quickly and then displacing the viscous oil with a petroleum fraction containing predominantly hydrocarbons having from 10 to 12 carbon atoms per molecule. This fraction is normally referred to as $C_{10}$–$C_{12}$. After the oil saturation had been established, the core was flooded alternately with the brine and with nitrogen. Results are shown in Table I.

*Table I*

| Injected Water | Injected Gas | Gas Saturation | Water Saturation | Residual Oil | Recovered Oil |
|---|---|---|---|---|---|
| 24.3 |  | 0 | 62.7 | 37.3 |  |
|  | 10.4 | 10.5 | 52.2 | 37.3 | 0 |
| 13.0 |  | 9.8 | 56.0 | 34.2 | 3.1 |
|  | 3.1 | 13.7 | 52.1 | 34.2 | 3.1 |
| 11.9 |  | 12.8 | 54.8 | 32.4 | 4.9 |
|  | 3.8 | 17.5 | 50.1 | 32.4 | 4.9 |
| 12.8 |  | 16.1 | 53.0 | 30.9 | 6.4 |
|  | 22.0 | 20.8 | 48.3 | 30.9 | 6.4 |
| 15.7 |  | 19.2 | 51.2 | 29.6 | 7.7 |

In the table all values are given in terms of percent of pore volume. Liquid saturations were determined by measuring volumes in and out. Gas volumes in and out were also measured, but it was found that more reliable gas saturation values could be determined by material balance of liquids. Therefore, the material balance values for gas saturation are given.

It was found that after about 10 percent water had been injected following gas, no further oil was recovered until more gas was injected. It will be apparent, therefore, that alternating injection of gas with a wetting phase liquid reduces the non-wetting liquid saturation to a value below that obtained by injecting the wetting phase liquid without gas. This would, of course, also apply if an oil bank was injected into an oil-wet formation following the alkaline water. In this case the oil would be the wetting liquid and the water the non-wetting liquid.

To determine the effects of alternating the injection of a non-wetting phase liquid with gas, a core was evacuated and filled with 0.25 normal sodium chloride brine and was then flooded with alternate portions of oil and gas. The results are presented in Table II.

*Table II*

| Injected Oil | Injected Gas | Gas Saturation | Oil Saturation | Residual Water | Recovered Water |
|---|---|---|---|---|---|
| 50.6 |  | 0 | 49.2 | 50.8 |  |
|  | 9.9 | 10.2 | 39.4 | 50.4 | 0.4 |
| 25.8 |  | 10.0 | 42.8 | 47.2 | 3.6 |
|  | 4.2 | 14.1 | 39.0 | 46.9 | 3.9 |
| 20.3 |  | 13.9 | 41.6 | 44.5 | 6.3 |
|  | 7.3 | 21.0 | 35.7 | 43.3 | 7.5 |
| 29.8 |  | 18.8 | 41.4 | 39.8 | 11.0 |

All values in Table II are in terms of percent of total pore volume.

In each oil flooding step, oil was injected until little, if any, additional water was being produced. Therefore, it is apparent from the data that intermittent injection of gas with oil in the oil bank will provide a lower water saturation than can be obtained with oil alone. As previously noted, the aid of the gas in facilitating removal of water by the oil bank is important since it is desirable to displace as much water as possible with as little oil as possible.

In order to insure an adequate degree of partial oxidation of the oil in the oil bank, it may be advisable to pre-oxidize this oil by air blowing, for example, before injection into the formation. Another possibility is to add high molecular weight acids to the oil bank before it is injected. Even though the oil bank may contain acids when it is injected, it is still usually advisable to alternate small volumes of the oil with volumes of gas to improve the ability of a small volume of the oil to displace as much as possible of the alkaline water, and thus decrease the rate at which the alkaline water collects behind the oil bank.

It will also be apparent from the data in Tables I and II that alternating air with the alkaline water preceding the oil bank and the flooding water following the oil bank will aid in the recovery of a larger volume of oil. Therefore, alternate injection of batches of air with volumes of all the injected liquids is advisable. The use of air intermittently iwth the alkaline water is particularly important. In this case if all the air is injected first to cause partial oxidation and then all the alkaline water is injected, it will be apparent that the water will displace most of the partially oxidized oil ahead of the water. By alternating the air with the alkaline water, however, there is greater assurance of the residual oil being well oxidized to provide a good concentration of acids in the oil bank into which the residual oil is collected.

Considering now the volumes and natures of fluids in the order in which they are injected into the formation, the first fluid may be either alkaline water or air. The total volume of alkaline water should lie somewhere between about 5 percent and about 30 percent of the flooded pore volume, preferably between about 10 and about 20 percent. If the water flows very little as the oil bank moves past, then the amount of alkaline water should be approximately equal to the residual water saturation at the trailing edge of the oil bank. This is usually about 30 or 40 percent. If the water moves at about the same rate as the oil, then the required amount of water is only a few percent, possibly 4 or 5 percent. Actually, the relative rates of movement of oil and water depend upon so many complex factors that it is generally best to use arbitrarily a volume of alkaline water equal to from about 10 to about 20 percent of the flooded pore volume. This may be slightly too much or slightly too little, but will be less expensive than using more water and will be more certain to be effective in a large portion of the reservoir than if less water is used.

For best development of an air saturation, the volume of gas should be at least half the volume of alkaline water. The principal reason for the air, however, is to provide partial oxidation of the oil. Therefore, the volume of air should preferably be between about 1 and about 2 times the volume of alkaline water. The volume of air may be as much as about 5 times the volume of alkaline water, but the expense of compressing and injecting so much air is rarely justified.

The alkaline water and air should be alternated. It is generally most convenient to break the volumes up into about 4 or 5 portions, preferably of about equal sizes. A larger number of portions is sometimes desirable. It will be apparent that at least one of the volumes must be divided into at least 2 portions if there is to be any alternating of air and water. The air and alkaline water may be injected simultaneously, but this is ordinarily less desirable than alternate injection for a number of reasons, such as segregation at the bottom of the well.

The amount of base in the alkaline water will vary between rather wide limits. A good range for most purposes is from about 0.1 to about 1.0 molar with the base. The best strength should be determined by air blowing a sample of the oil and measuring the interfacial tension of the oil in contact with water containing various amounts of bases, such as sodium hydroxide, sodium carbonates, or the like. Similar tests in which the nature and strength of various salts, such as sodium chloride, calcium chloride, sodium phosphate, and the like are varied may also be made to determine optimum alkaline water compositions. Ordinarily, about a 5 percent sodium chloride brine is preferred.

The volume of the oil bank may theoretically be as small as about 100 barrels per linear foot of thickness of the formation to be flooded for each injection well. This volume is determined principally by two factors. One is maintaining the desired width of oil bank in the formation until it reaches the point in the formation at which radial flow causes the bank thickness to increase rather than decrease. The second factor is the efficiency of displacement of the alkaline water by the oil bank. Alternate air injection with the alkaline water and oil increases the efficiency of water displacement; but even when air is alternated with the water, use of somewhat more than the minimum of 100 barrels of oil per linear foot of exposed formation thickness is generally desirable. Use of more than about 1,000 barrels per linear foot is rarely justified from an economic standpoint. Preferably a volume from about 300 to about 700 barrels per linear foot of formation thickness should be employed. When the term "barrel" is used herein, the 42-gallon barrel used as a unit in the oil field is intended.

When air and oil are alternated in the oil bank, the volume ratio may be as little as 1 air to 2 oil. Such a ratio may be used, for example, if the oil has been partially oxidized before injection into the formation. To insure an adequate degree of oxidation if the oil has not been previously oxidized, the volume of air alternated with oil in the oil bank may be as high as about 10 times the volume of the oil. In most cases an air-to-oil ratio of from about 1 to 1 to about 5 to 1 should be used. As in the case of the alkaline water, the oil and gas volumes are preferably divided into about 4 or 5 portions and possibly somewhat more. The oil volume must, of course, be divided into at least two portions if it is to be alternated with air.

As previously noted, the regular flooding water which follows the oil bank may also be alternated with air or another gas, such as natural gas. For best results the volumes of water should not exceed about 10 percent of the flooded pore volume and the alternated gas injections should not exceed about 5 percent of the flooded pore volume.

An example of the application of my process is as follows. An oil-bearing formation 1,500 feet deep is penetrated by wells drilled on a rectangular pattern with 10-acre spacing. The formation is 12 feet thick. It has a porosity of 22 percent. Laboratory tests indicate a 5 percent sodium chloride brine containing 2 percent by weight of sodium hydroxide is about optimum for flooding oil from the formation after the oil has been partially oxidized by air blowing.

In the field an additional well is drilled in the center of each rectangle formed by 4 old wells to provide a 5-spot pattern with the old wells. The new wells are used as injection wells through which the alkaline brine and air are alternately injected. The total volume of alkaline brine injected into each well is about 20,000 barrels. This is about 15 percent of the pore volume expected to be flooded, which is in turn about 70 percent of the total pore volume. The volume of air is about 200,000 cubic feet at a formation pressure of about 300 to 400 pounds per square inch. This is about twice the volume of the alkaline brine at formation conditions.

The alkaline water and air are divided into five portions each. One 4,000-barrel portion of alkaline brine is injected first, and then a 40,000-cubic foot (at 300 to 400 p.s.i.g.) portion of air is injected. Then the other portions are alternated. In this way one of the air portions is the last to be injected before the oil bank is introduced. This insures the best partial oxidation of the oil in the reservoir as well as of the following oil bank.

Next, oil banks are introduced through the injection wells. The oil has been pre-oxidized by air blowing. The total volume of oil injected through each input well is about 3,600 barrels (about 300 barrels per foot of formation thickness). This oil is divided into four portions of about 900 barrels each, which are alternated with the volumes of air. The air volumes are about 7,000 cubic feet each (at formation conditions) which is about twice the volume of the oil portions. Four air volumes are also injected which permits air to follow the last oil portion and thus insure good partial oxidation.

Finally, ordinary flooding water, which is partly oil field brine and partly surface water, is injected. This water is introduced in batches of about 15,000 barrels (a little over 10 percent flooded pore volume) alternated with air in volumes of about 40,000 cubic feet at formation conditions (about ½ the volumes of the water batches).

The oil wells in the field are used as producing wells. From these wells the oil is produced to the surface in a normal manner.

I claim:

1. In the process for recovering oil from an oil-bearing formation penetrated by at least one injection well and at least one producing well, in which process a volume of air and a volume of alkaline water are injected into said formation through said at least one injection well, and then flooding water is injected through said at least one injection well and into said formation, the improvement comprising injecting into said formation ahead of said flooding water a volume of oil equivalent to at least about 100 barrels of oil per linear foot of thickness of formation to be flooded, the alkaline water being at least about 0.1 molar with a base and the volume of the air being at least about ½ the volume of the alkaline water.

2. The process of claim 1 in which said volume of oil is partially pre-oxidized before it is injected into said formation.

3. The process of claim 1 in which said volume of oil is divided into portions which are injected alternately with volumes of air.

4. The process of claim 3 in which said volume of oil is partially pre-oxidized before it is injected into said formation.

5. The process of claim 1 in which the amount of said volume of oil is between about 100 and 1,000 barrels per foot of thickness of said formation for each injection well.

6. The process of claim 5 in which said volume of oil is partially pre-oxidized before it is injected into said formation.

7. The process of claim 5 in which said volume of oil is divided into portions which are injected alternately with volumes of air which are, at formation conditions, between about ½ and about 10 times the volumes of the portions of oil.

8. The process of claim 7 in which said volume of oil is partially pre-oxidized before it is injected into said formation.

9. A process for recovering oil from an oil-bearing formation penetrated by at least one injection well and at least one producing well comprising injecting through said at least one injection well and into said formation a volume of air and a volume of alkaline water, then injecting through said at least one injection well and into said formation a volume of oil, next injecting flooding water through said at least one injection well and into said formation, and recovering oil from said at least one producing well during at least a part of the injection process, said alkaline water being from about 0.1 to about 1.0 molar with a base, said alkaline water having a volume between about 5 and about 30 percent of the pore volume of said formation flooded by water injected through said at least one injection well, said volume of air being between about ½ and about 5 times the volume of said alkaline water, and said volume of oil being in an amount from about 100 to about 1,000 barrels per foot of thickness of said formation for each injection well.

10. The process of claim 9 in which said volume of oil is divided into portions which are injected alternately with volumes of air which are, at formation conditions, between about ½ and about 10 times the volumes of the portions of oil.

11. The process of claim 9 in which said volume of oil is partially pre-oxidized before it is injected into said formation.

12. The process of claim 11 in which said volume of oil is divided into portions which are injected alternately with volumes of air which are, at formation conditions, between about ½ and about 10 times the volumes of the portions of oil.

13. The process of claim 9 in which said volume of alkaline water and said volume of air are divided into portions which are injected alternately.

14. The process of claim 13 in which said volume of oil is divided into portions which are injected alternately with volumes of air which are, at formation conditions, between about ½ and about 10 times the volumes of the portions of oil.

15. The process of claim 14 in which said flooding water is divided into portions which are injected alternately with volumes of air.

References Cited by the Examiner
UNITED STATES PATENTS

| | | | |
|---|---|---|---|
| 2,927,637 | 3/60 | Draper | 166—9 |
| 3,036,631 | 5/62 | Holbrook | 166—9 |

BENJAMIN HERSH, *Primary Examiner.*

CHARLES E. O'CONNELL, *Examiner.*